United States Patent
Ogawa

(10) Patent No.: US 7,298,290 B2
(45) Date of Patent: Nov. 20, 2007

(54) DSRC CONTROLLER AND A METHOD THEREFOR

(75) Inventor: Koichi Ogawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 227 days.

(21) Appl. No.: 11/014,246

(22) Filed: Dec. 17, 2004

(65) Prior Publication Data
US 2005/0136855 A1 Jun. 23, 2005

(30) Foreign Application Priority Data
Dec. 19, 2003 (JP) .................. P 2003-422189

(51) Int. Cl.
G08G 1/09 (2006.01)
G08G 1/065 (2006.01)
H04B 7/00 (2006.01)
H04J 13/04 (2006.01)
H04L 7/00 (2006.01)

(52) U.S. Cl. .............. 340/928; 340/905; 370/480; 455/41.2; 455/99; 375/368; 375/369; 375/365; 375/366; 375/370

(58) Field of Classification Search .......... 340/928, 340/905; 370/480; 455/41.2, 99; 375/368, 375/369, 366, 370
See application file for complete search history.

(56) References Cited

U.S. PATENT DOCUMENTS 6,275,552 B1 * 8/2001 Ando .................. 375/368
6,829,531 B2 * 12/2004 Lee .................... 701/205
2003/0129952 A1 7/2003 Inoue
2005/0220150 A1 * 10/2005 Oyama ................ 370/503
2006/0073857 A1 * 4/2006 Hanabusa et al. ...... 455/572

FOREIGN PATENT DOCUMENTS

JP 2002-368829 12/2002
JP 2003-069544 3/2003

* cited by examiner

Primary Examiner—Julie Bichngoc Lieu
(74) Attorney, Agent, or Firm—McDermott Will & Emery LLP

(57) ABSTRACT

In a DSRC communications controller equipped with a plurality of reception means for DSRC communications according to the invention, a reception reservation storage section 104 comprises means for detecting a communications frame start signal (unique word 1) of DSRC communications by using reception means not engaged in communications among the plurality of reception means and means for storing the control information of DSRC communications where the communications frame start signal is detected. On completion of DSRC communications by way of reception means, a controller uses the control information stored in the reception reservation storage section to establish next communications. This allows continuous reception of information from a plurality of roadside machines to be made efficiently even in case a plurality of communications areas overlap one another.

4 Claims, 4 Drawing Sheets

DSRC CONTROLLER AND A METHOD THEREFOR

BACKGROUND OF THE INVENTION

1. Field of the Invention

The present invention relates to a Dedicated Short range Communication (DSRC) controller and a method used for such systems as the Electronic Toll Collection (ETC) system.

2. Description of the related art

The Electronic Toll Collection (ETC) system on a toll road has been operated as a forerunner of the Intelligent Transportation Systems (ITS). In the ETC, a toll is automatically collected by way of wireless communications using the communications control system called the Dedicated Short range Communication (DSRC) between an ETC unit mounted on a vehicle and a roadside wireless apparatus installed in a tollgate.

DSRC modulation systems in the ETC include the Amplitude Shift Keying (ASK) system and the Quadrature Phase Shift Keying (QPSK) system. In some DSRC controllers of the related art car-mounted DSRC communications units, the control section assigns a waiting priority order based on the information such as a receiving frequency band and a receiving field strength and determines that a signal whose reception is finalized earliest (a signal whose unique word 1 is detected) is "received" and selects the signal (for example, refer to Japanese Patent Laid-Open No. 2003-69544).

FIG. 3 is a block diagram showing an exemplary configuration of a DSRC controller in a related art car-mounted DSRC communications unit. In FIG. 3, a numeral 301 represents a QPSK demodulator, 302 a QPSK unique word drawing section, 303 an ASK demodulator, 304 an ASK unique word drawing section, 305 a communications control system switching circuit, and 306 a unique word format storage section.

The DSRC controller comprising a QPSK demodulation system and an ASK demodulation system compares a unique word drawing result with a unique word stored in the format storage section 306 by the communications control system switching circuit 305, and in case any unique word is detected, outputs a synchronization signal. In this way, the DSRC controller identifies the communications system used by a received signal from among the plurality of communications systems and selects a proper system to process the demodulated data.

Some of the DSRC controllers in related art car-mounted DSRC communications units determine which modulation system is used and select a demodulator by observing the transition of the power value of a received signal from an RF section (for example, refer to Japanese Patent Laid-Open No. 2002-368829).

FIG. 4 is a block diagram showing another exemplary configuration of a DSRC controller in a related art car-mounted DSRC communications unit. In FIG. 4, a numeral 401 represents a receiving power measurement section, 402 a modulation system determination section, 403 a selector switch, 404 a QPSK demodulator, and 405 an ASK demodulator. The receiving power measurement section 401 measures the power value of a received wave. The modulation system determination section 402 determines a modulation system by checking, based on the measurement result, whether a state where a power value below a threshold continues for a predetermined period. The selector switch 403 toggles based on the determination result to select the QPSK demodulator 404 or the ASK demodulator 405.

In recent years, with the increase in the ETC or DSRC applications using the DSRC communications system, a plurality of communications areas are overlapping one another. This presents the current problem of jamming in a related art DSRC communications controller. It is thus necessary to determine a mating roadside machine from among the plurality of roadside machines while preventing possible jamming even in a state where a plurality of communications areas overlap one another. More urgent information must be communicated to a car-mounted DSRC communications unit earlier than other information.

SUMMARY OF THE INVENTION

The invention has as an object to provide apparatus and a method which stably and efficiently establish communications between a roadside machine and a car-mounted DSRC communications unit in a communications system such as the RTC using the DSRC communications system, even in a state where a plurality of communications areas overlap one another.

A DSRC communications controller according to the invention is a controller equipped with a plurality of reception means for DSRC communications, the DSRC communications controller comprising means for detecting a communications frame start signal (unique word 1) of DSRC communications by using reception means not engaged in communications among the plurality of reception means, means for storing the control information of DSRC communications where the communications frame start signal is detected, and means for establishing next communications by using the stored control information on completion of DSRC communications by the reception means engaged in communications. With this configuration, it is possible to use reception means not engaged in communications to incorporate, into a car-mounted DSRC communications unit, control information of DSRC communications from a roadside machine other than a roadside machine engaged in communications. This allows continuous reception of information from a plurality of roadside machines to be made efficiently even in case a plurality of communications areas overlap one another.

A DSRC communications control method according to the invention is a method for a DSRC communications controller equipped with a plurality of reception means for DSRC communications, the method comprising a step of detecting a communications frame start signal (unique word 1) of DSRC communications by using reception means not engaged in communications among the plurality of reception means, a step of storing the control information of DSRC communications where the communications frame start signal is detected, and a step of establishing next communications by using the stored control information on completion of DSRC communications by the reception means engaged in communications. With this configuration, it is possible to use reception means not engaged in communications to incorporate, into a car-mounted DSRC communications unit, control information of DSRC communications from a roadside machine other than a roadside machine engaged in communications. This allows continuous reception of information from a plurality of roadside machines to be made efficiently even in case a plurality of communications areas overlap one another.

A DSRC system according to the invention comprises a car-mounted DSRC communications unit which mounts a DSRC communications controller of the invention and a DSRC roadside machine which controls the car-mounted DSRC communications unit. In the inventive DSRC system, the DSRC roadside machine transmits information with higher communication priority to a car-mounted DSRC communications unit engaged in DSRC communications with another roadside machine in the same communications area by taking preemptive priority while the DSRC communications with the roadside machine are under way. With this configuration, it is possible to take preemptive priority in transmitting information, including an emergency report and traffic service control information, to a roadside machine engaged in communications from another roadside machine.

According to the invention, it is possible to use reception means not engaged in communications to incorporate, into a car-mounted DSRC communications unit, information from a roadside machine other than a roadside machine engaged in communications. This allows continuous reception of information from a plurality of roadside machines to be made efficiently even in case a plurality of communications areas overlap one another, thereby enhancing stability and efficiency of communications in a plurality of communications areas. With the additional specifications in the communications standard T75 covering roadside machines, it is possible to transmit, with higher priority, emergency information and urgent braking of a vehicle.

DESCRIPTION OF THE PREFERRED EMBODIMENTS

Figure 1:
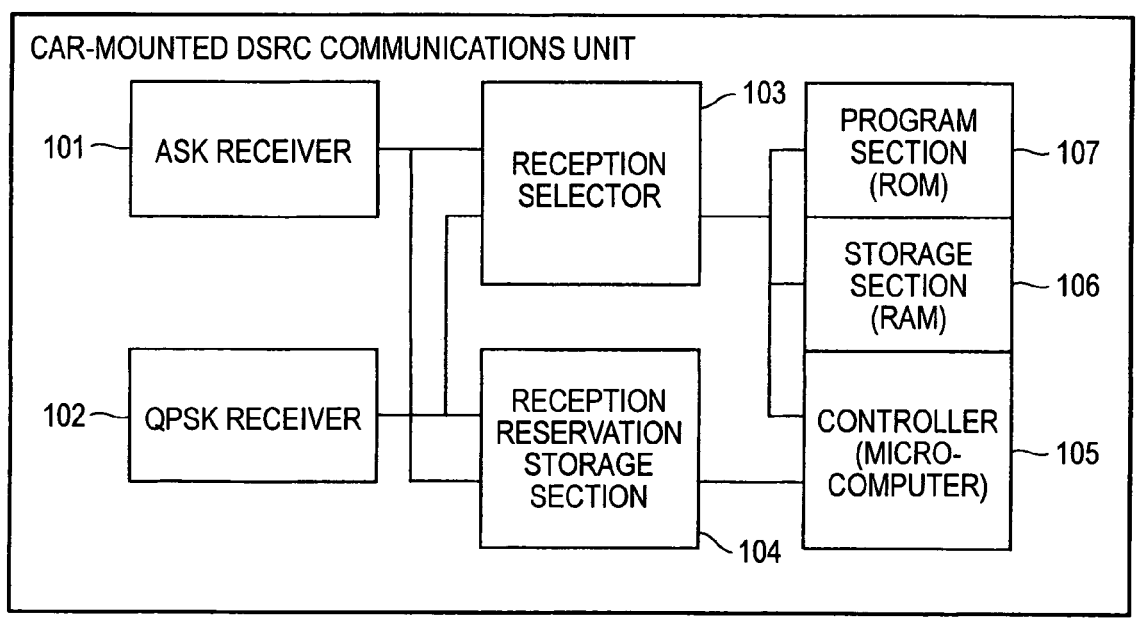
FIG. 1 is a block diagram showing a configuration of a DSRC communications controller according to an embodiment of the invention.

FIG. 1 is a block diagram showing a configuration of a DSRC communications controller according to an embodiment of the invention. In FIG. 1, a numeral 101 represents an ASK receiver, 102 a QPSK receiver, 103 a reception selector, 104 a reception reservation storage section, 105 a controller using a microcomputer, 106 a storage section such as a RAM, and 107 a program section such as a ROM.

Figure 2:
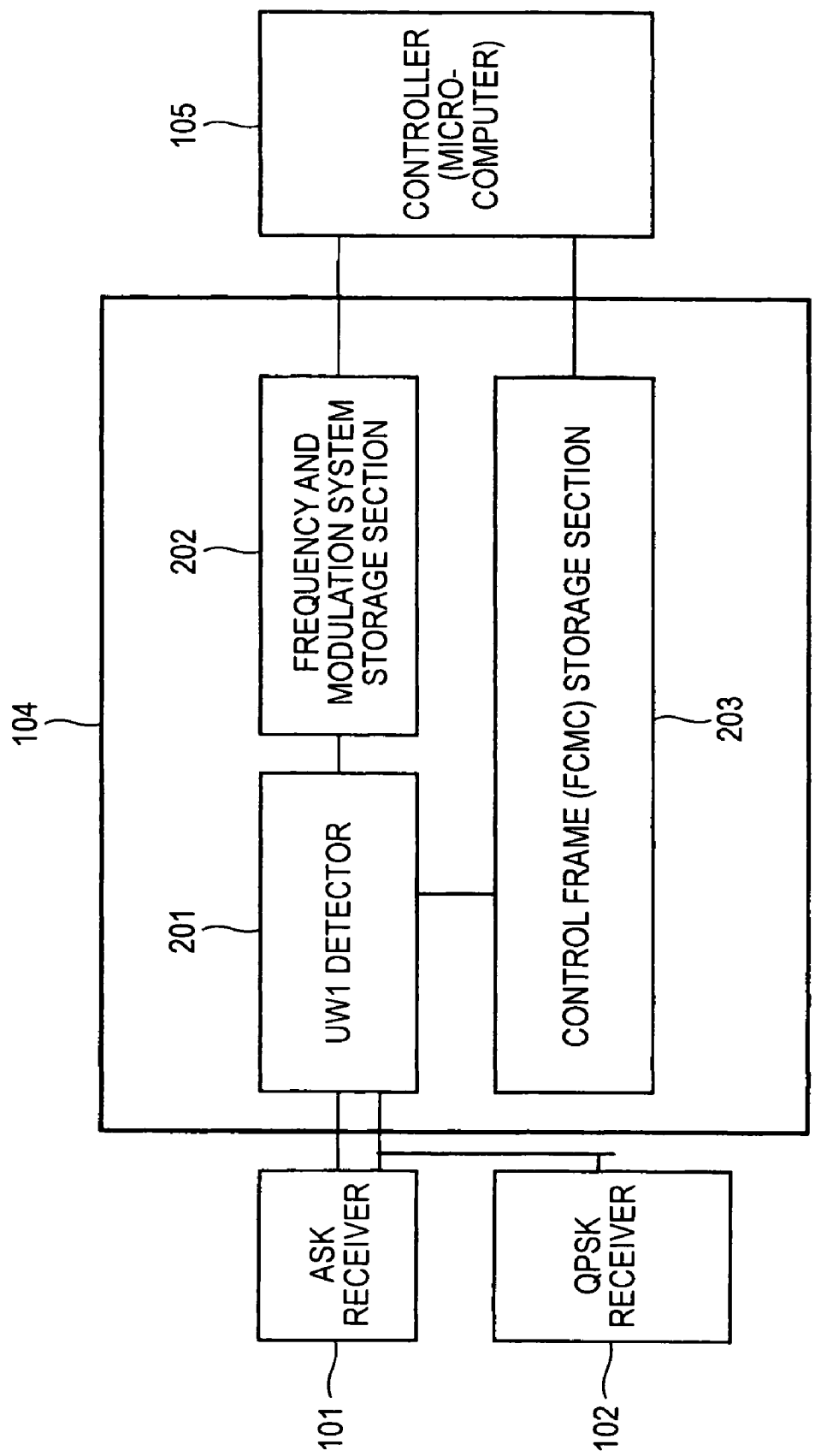
FIG. 2 is a block diagram showing an exemplary configuration of a reception reservation storage section.
Figure 3:
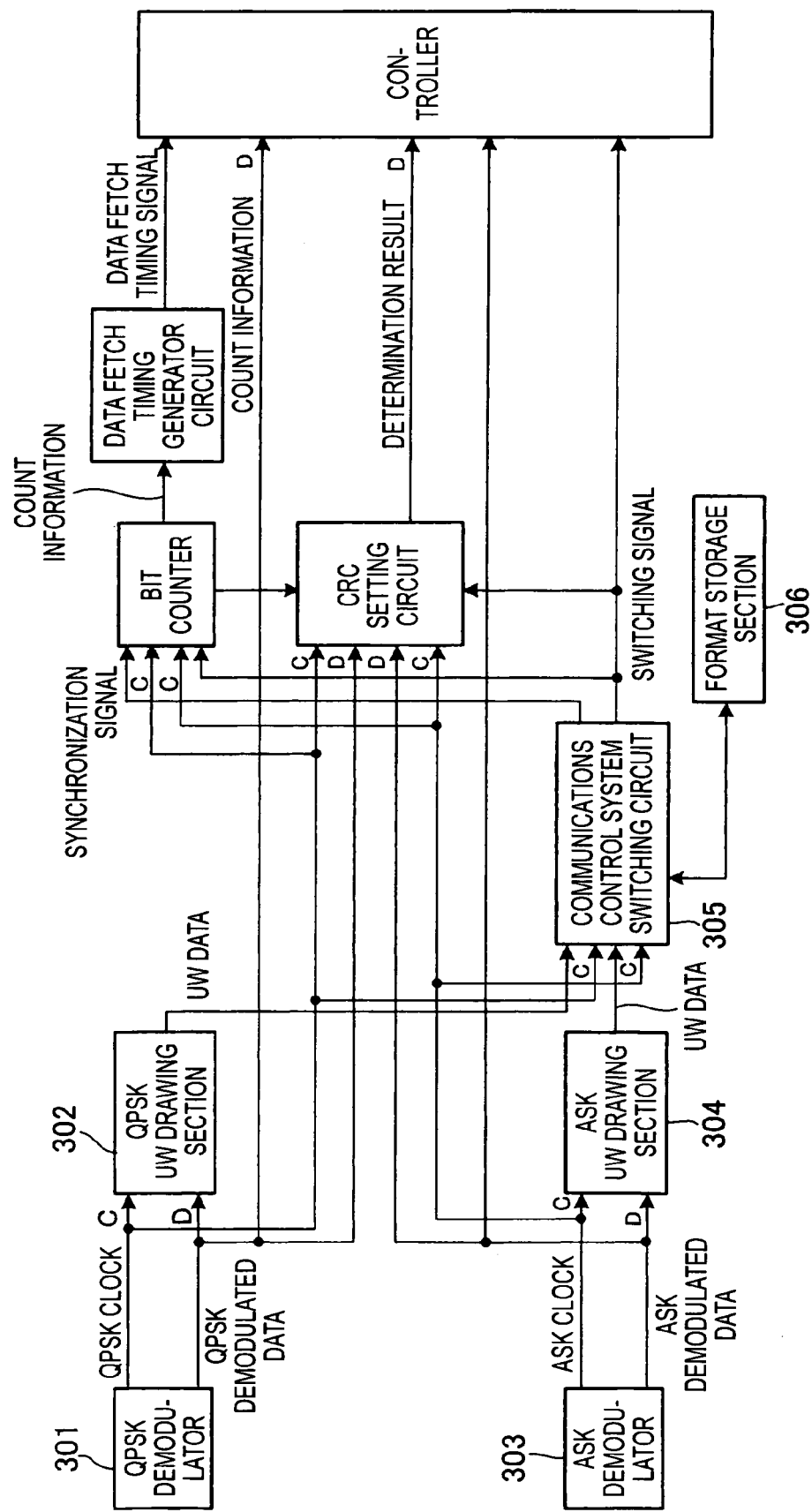
FIG. 3 is a block diagram showing an exemplary configuration of a DSRC controller in a related art car-mounted DSRC communications unit.
Figure 4:
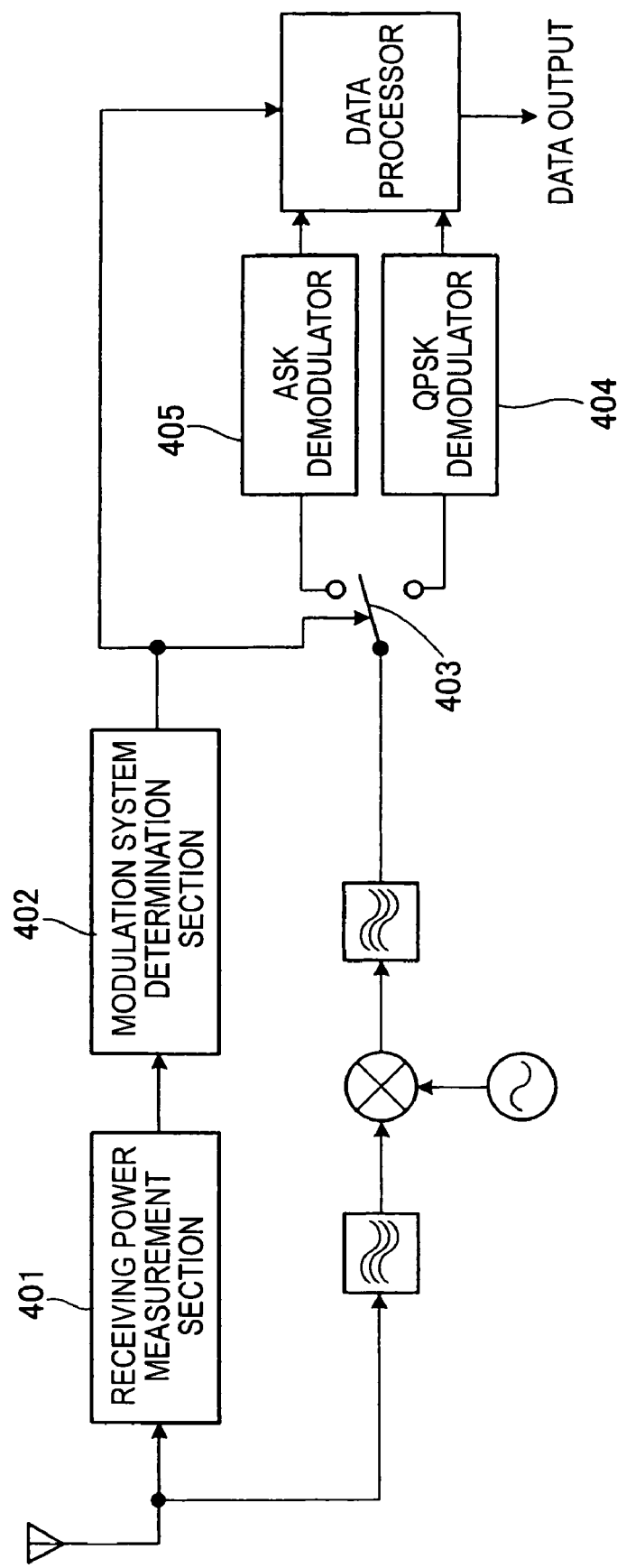
FIG. 4 is a block diagram showing another exemplary configuration of a DSRC controller in a related art car-mounted DSRC communications unit.

FIG. 2 is a block diagram showing an exemplary configuration of the reception reservation storage section 104. In FIG. 2, a numeral 201 represents a unique word 1 (UW1) detector, 202 a frequency and modulation system storage section, and 203 a control frame (FCMC) storage section.

In the DSRC communications controller thus configured, when DSRC communications are started, reception of information follows the related art procedure. Same as the related art practice, the controller 105 assigns a waiting priority order based on the information such as a receiving frequency band and a receiving field strength and determines that a signal whose reception is finalized earliest (a signal whose unique word 1 is detected successively) is "received". The reception selector 103 selects the ASK receiver 101 or the QPSK receiver 102 and starts communications.

In this practice, the ASK receiver 101 or the QPSK receiver 102, whichever is not used for DSRC communications, is used to search for a roadside machine other than a roadside machine under communications. That is, the data in the receiver of a non-communicating roadside machine is supervised by the unique word 1 (UW1) detector 201 to wait for a signal unique word 1 indicating the head of a communications frame coming from a roadside machine.

Once the unique word 1 is detected by the unique word 1 (UW1) detector 201, information on the receiving frequency and modulation system used when the UW1 is detected and information from the roadside machine are recorded, as information on a candidate roadside machine for next communications, into the frequency and modulation system storage section 202. Then, all or part of the control frames (FCMCs) following the UW1 is recorded into the control frame (FCMC) storage section 203 so as to allow assignment of a priority order.

When the ongoing communications are over, the controller 105 determines a receiving frequency and a modulation system based on the roadside machine information recorded in the frequency and modulation system storage section 202 and the control frame (FCMC) storage section 203 and establishes next communications efficiently and appropriately in order to start communications anew.

By way of the aforementioned procedure, it is possible to, in case a parking lot charge payment signal is received over the control frame (FCMC) of QPSK when music delivery is on the way over the FCMC of ASK, previously store the frequency and modulation system into the frequency and modulation system storage section 202 and start communications related to the parking lot charge payment of QPSK on a higher priority basis by way of the control by the controller 105, once the communications frames for music delivery of ASK are over.

While a peripheral road map is urgently being received by way of QPSK, the unique word 1 of traffic accident information transmitted from another roadside machine by way of ASK is received by the unique word 1 (UW1) detector 201 and FCMC from the roadside machine is stored into the control frame (FCMC) storage section 203. The controller (microcomputer) 205 can refer to the information to determine a priority order for immediate reception of traffic accident information over ASK once the peripheral road map is received.

By specifying a priority order at a section of reserved bits following the DSRC communications standard, it is possible to abort reception of the peripheral road map over QPSK when receiving a vehicle control signal to be urgently sent, so as to obtain information such as urgent vehicle braking In practice, information such as an emergency report and traffic service control from a roadside machine is transmitted to a car-mounted DSRC communications unit engaged in communications with another roadside machine, on a preemptive priority basis or forcibly. For example, reserved bits in the SC (Service Application Control) field of a control frame (FCMC) may be used to transmit in real time information with high priority or binding force.

As mentioned hereinabove, it is possible to utilize a receiver of a modulating system which is not used once communications are started in the related art to detect the unique word 1 from a roadside machine other than one engaged in communications and store the receiving conditions and control information of a signal to be communicated next, thereby incorporating into a car-mounted DSRC communications unit information from a roadside machine other than one under communications. This makes it possible to effectively perform continuous reception of information from a plurality of roadside machines even in case a plurality of communications areas overlay one another. It is also possible to take preemptive priority in transmitting information, including an emergency report and traffic service control information, to a roadside machine engaged in communications from another roadside machine.

The DSRC communications controller and the method therefor utilize reception means not engaged in communications to incorporate information from a roadside machine other than one under communications into a car-mounted DSRC communications unit. The inventive DSRC communications controller and method are advantageous in that continuous reception of information from a plurality of roadside machines in an efficient fashion in case a plurality of communications areas overlap one another. This enhances the stability and efficiency of communications in a plurality of communications areas. The invention is thus useful for a Dedicated Short range Communication (DSRC) technology used in such applications as the ETC system.

What is claimed is:

1. A DSRC communications controller equipped with a plurality of reception means for DSRC communications, comprising:
    means for detecting a communications frame start signal (unique word 1) of DSRC communications by using reception means not engaged in communications among the plurality of reception means;
    means for storing the control information of DSRC communications where the communications frame start signal is detected; and
    means for establishing next communications by using the stored control information on completion of DSRC communications by the reception means engaged in communications.

2. A DSRC communications control method for controlling DSRC communications by using a plurality of reception means for DSRC communications, comprising the steps of:
    detecting a communications frame start signal (unique word 1) of DSRC communications by using reception means not engaged in communications among the plurality of reception means;
    storing the control information of DSRC communications where the communications frame start signal is detected; and
    establishing next communications by using the stored control information on completion of DSRC communications by said reception means engaged in communications.

3. A DSRC system, comprising:
    a car-mounted DSRC communications unit, including a DSRC communications controller according to claim 1; and
    a DSRC roadside machine, controlling the car-mounted DSRC communications unit.

4. The DSRC system according to claim 3, wherein the DSRC roadside machine transmits information with higher communication priority to a car-mounted DSRC communications unit engaged in DSRC communications with another roadside machine in the same communications area by taking preemptive priority while the DSRC communications with said roadside machine are under way.

* * * * *